Patented Feb. 6, 1951

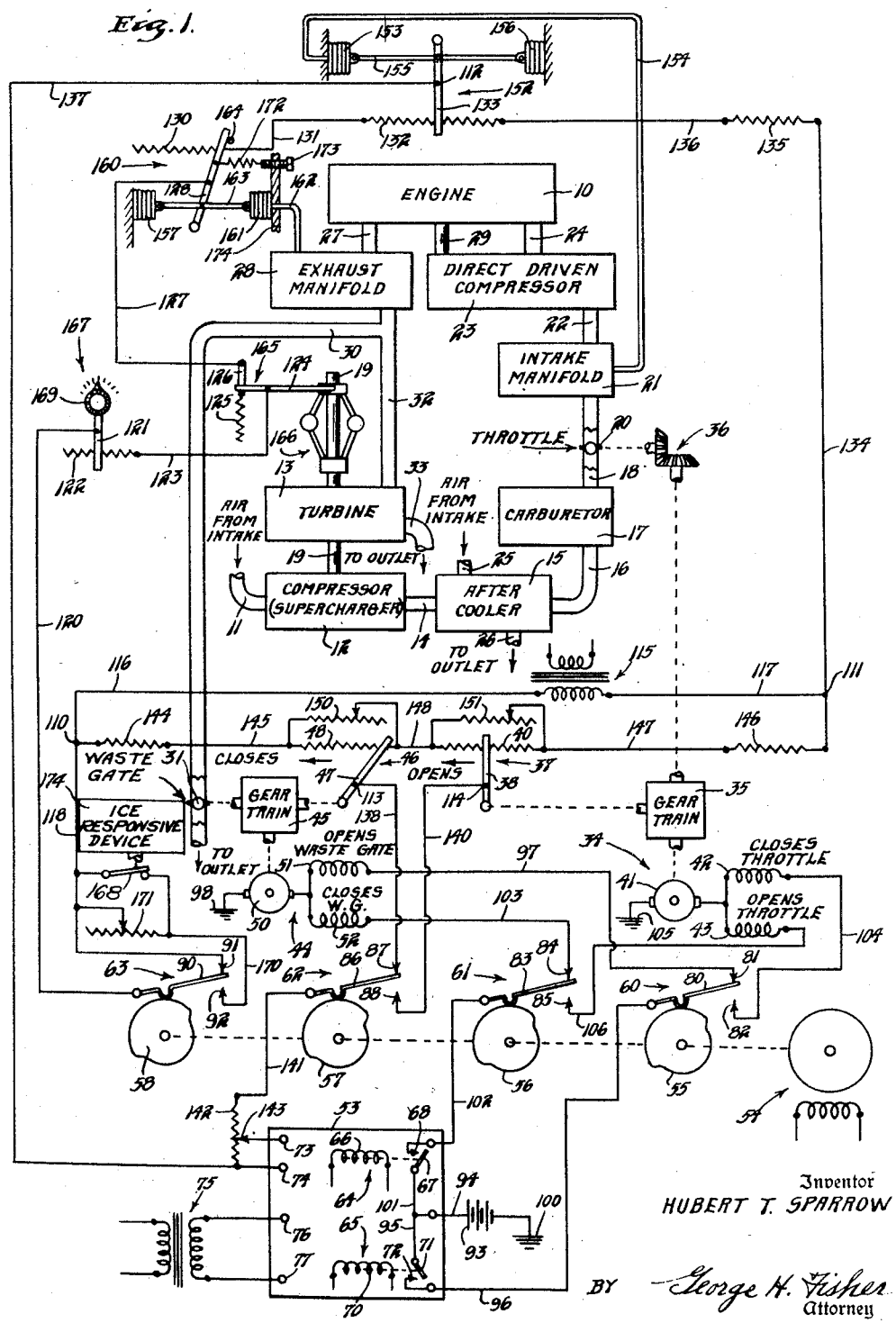

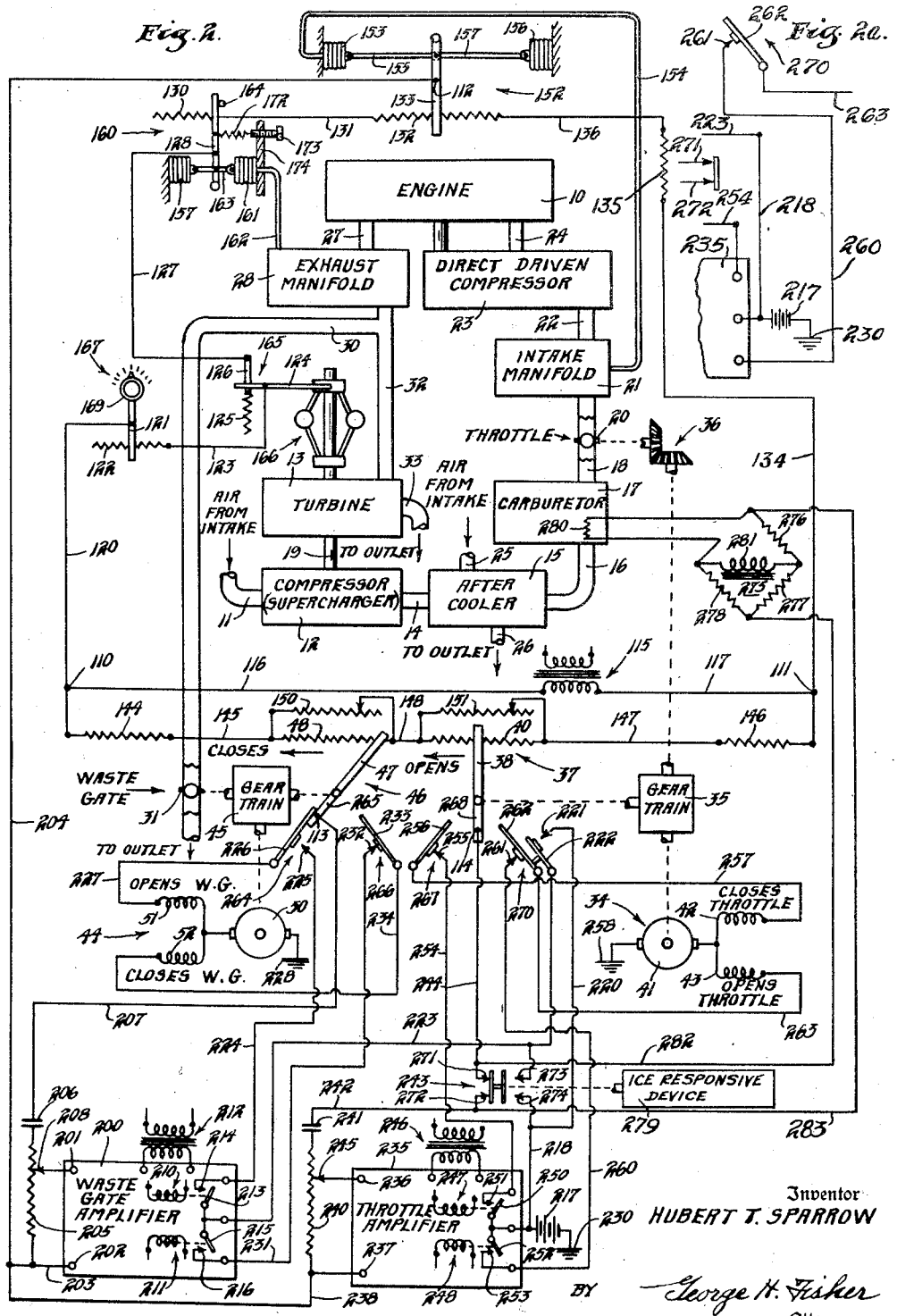

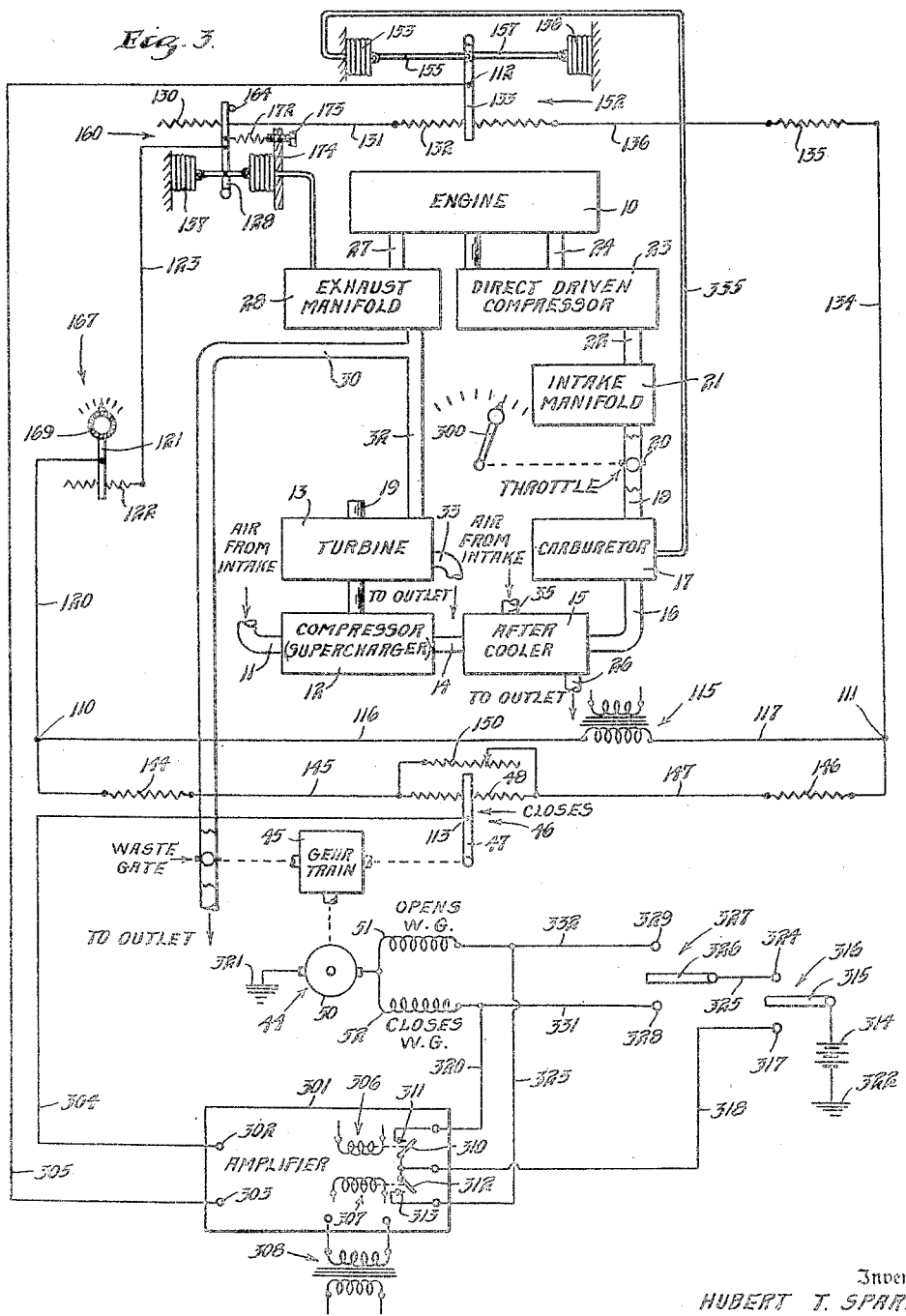

2,540,916

UNITED STATES PATENT OFFICE 2,540,916

PRESSURE, TEMPERATURE, AND SPEED CONTROL APPARATUS FOR SUPERCHARGED COMBUSTION ENGINES

Hubert T. Sparrow, Minneapolis, Minn., assignor to Minneapolis-Honeywell Regulator Company, Minneapolis, Minn., a corporation of Delaware Application February 1, 1943, Serial No. 474,378

28 Claims. (Cl. 60—13)

The present invention relates to the automatic control of combustion engines, and particularly to the control of the pressure in the intake of such engines.

In combustion engines of conventional type, the power output of the engine varies as a function of the pressure in the intake, since that pressure determines the amount of fuel in each charge reaching the combustion chamber or cylinders. In many cases where combustion engines are used, it is desirable to maintain the output of the engine substantially constant, or to change it to a predetermined value. This is particularly true in the case of combustion engines used to drive the propellers of aircraft, wherein it is frequently desirable to maintain the engine constantly at its optimum power output. In order to maintain the power output constant, the intake pressure should be maintained constant. The intake pressure is subject to variations due to several variable conditions, chief of which are variations in the external atmospheric pressure, and variations in the position of the throttle. Furthermore, some aircraft engines are provided with a compressor, or supercharger, driven by a turbine which is powered from the exhaust gases of the engine. The speed and hence the compression ratio of this compressor is usually controlled by a waste gate, which by-passes to the atmosphere a portion of the exhaust gases issuing from the exhaust manifold.

In an engine provided with a throttle and a supercharger controllable by a waste gate, the fuel supply to the engine is normally increased first by moving the throttle toward its full open position, while the waste gate remains in its full open position and the supercharger or compressor is not operated. After the throttle has been moved to its full open position, the fuel supplied to the engine may be further increased by closing the waste gate gradually, thereby bringing the compressor into operation and increasing the intake manifold pressure.

From the foregoing, it should be apparent that in order to provide a complete system for controlling the intake manifold pressure of an internal combustion engine wherein a turbine-driven compressor is used for supplying air under pressure to the carburetor, means must be provided for controlling both the throttle and the waste gate of the turbine driving the compressor, or other means which controls the compression ratio of the compressor.

Since the air passing through the compressor is heated by the act of compression, it is customarily passed through a heat exchanger, commonly termed an after-cooler, after leaving the compressor, so as to increase the density of the air as it enters the engine. The after-cooler does not take all the heat out of the air, so that the air entering the carburetor is warmer when the compressor is operating than when it is not operating. Upon the occurrence of conditions which might cause the formation of ice in the carburetor, it is customary for the pilot of an aircraft to close the throttle slightly so as to reduce the intake manifold pressure, and then to close the waste gate slightly so as to cause increased operation of the compressor, and hence an increased temperature of the air entering the carburetor, thereby inhibiting the formation of ice therein. By proper adjustment of the throttle and waste gate, the intake manifold pressure may be maintained constant while increasing the temperature of the air supplied to the intake manifold.

Turbines of the type used commonly to drive the compressors associated with aircraft engines operate at very high speeds, in the neighborhood of 20,000 revolutions per minute. The speed at which these devices rotate is near the upper limits of permissible speed. Therefore, means should be provided for preventing the operation of the turbine at a speed greater than a predetermined limiting value.

It is therefore an object of the present invention to provide an improved system for controlling the intake manifold pressure of an internal combustion engine.

Another object of the present invention is to provide an intake manifold pressure control system for an engine equipped with a compressor, including means for controlling the throttle position and means for controlling the compression ratio of the compressor.

Another object of the present invention is to provide a system for controlling the intake manifold pressure of an internal combustion engine, including means responsive to the intake manifold pressure, and means responsive to other compensating conditions.

Another object of the present invention is to provide, in an intake manifold pressure control system, means for limiting the speed of a compressor used to supply compressed air to the intake manifold.

A further object of this invention is to provide an intake manifold pressure control system, in which the means controlling the manifold pressure is moved proportionately to each change in the intake manifold pressure.

A further object is to provide an improved electrical proportioning control system for sequentially controlling the throttle and the compressor in an intake manifold pressure control system.

A further object of the present invention is to provide an intake manifold pressure control system in which a device for controlling the compression ratio of a compressor is varied after a throttle positioning device has first been operated to move the throttle to full open position.

A still further object is to provide, in such a system, an arrangement whereby the throttle and the compression ratio controlling means may be made to operate overlappingly rather than sequentially, so as to increase the temperature of the air supplied to the intake manifold while maintaining the pressure therein substantially constant.

Other objects and advantages of the present invention will become apparent from a consideration of the accompanying specification, claims and drawing, in which:

Figure 1 represents, somewhat disgrammatically, an intake manifold pressure control system embodying my invention, Figure 2 represents a modification of the intake manifold pressure control system of Figure 1, Figure 2a represents a portion of a modification of the system shown in Figure 2, and Figure 3 represents, somewhat diagrammatically, a further modification of the intake manifold pressure control system of Figure 1.

Figure 1

Referring to Figure 1, there is shown an internal combustion engine 10, which may be the engine of an aircraft. Air for supporting the combustion of fuel within the engine cylinders is supplied from an intake (not shown) which may be located in the leading edge of the wing of the aircraft, and passes through a duct 11, a compressor 12 driven by a turbine 13, a duct 14, an after-cooler 15, and a duct 16 to a carburetor 17, where it is mixed with fuel from a suitable source of supply (not shown). From the carburetor 17, the fuel and air mixture passes through a duct 18 in which a throttle valve 20 is located, an intake manifold 21, a duct 22, a compressor 23 which is driven through gearing directly from the shaft 29 of the engine 10, and a duct 24 to the engine 10.

The compressor 12 is essentially a high speed fan, so that when the compressor is stationary, the air may pass freely through it, with only a relatively small amount of resistance due to friction. The after-cooler 15 is a heat exchanger for removing the heat of compression from the air discharged by the compressor 12. Cooling air from an intake not shown in the drawing, and preferably located in the leading edge of a wing of the aircraft, enters the after-cooler through a duct 25, and after passing through a series of tubes or other heat exchanging structure so that it absorbs some of the heat from the air discharged by the compressor 12, passes through a duct 26 to an outlet which may be located in the trailing edge of a wing of the aircraft.

The direct driven compressor 23 is also of the fan type, and since it is driven by the engine 10, its speed and hence its compression ratio varies directly as the speed of the engine 10. On some types of aircraft engines, the direct driven compressor is an integral part of the engine, and serves not only as a compressor but as a means for evenly distributing the fuel and air mixture to the various cylinders.

Although I have shown the compressor 23 and the intake manifold 21 as separate units, on most engines the direct-driven compressor is inside the housing generally referred to as the intake manifold. They are shown separately in the present diagrammatic disclosure merely for the purpose of simplifying the discussion.

Exhaust gases from the engine 10 pass through a duct 27 to an exhaust manifold 28. From the exhaust manifold 28, the exhaust gases may pass either through a duct 30 controlled by a waste gate 31 to an outlet not shown in the drawing, or through a duct 32 to the turbine 13, and from the turbine 13 through a duct 33 to the discharge outlet. It may be seen that when the waste gate 31 is open, the resistance to passage of exhaust gases through the duct 30 is much lower than the resistance to the passage of gasses through the duct 32 and turbine 33. Therefore, when the waste gate 31 is open, the turbine 13 is not operated. As the waste gate is closed, the pressure in the exhaust manifold increases, until the pressure differential between the exhaust manifold and the outside atmosphere is sufficient to cause rotation of the turbine 13.

The throttle 20 is driven by a motor generally indicated at 34 through a gear train 35, and a pair of bevel gears indicated at 36. The motor 34 also drives a throttle follow-up potentiometer 37, which comprises a slider 38 movable along a slidewire resistance 40. The motor 34 is shown, by way of example, as being of the direct current series wound type, and includes an armature 41 and a pair of field windings 42 and 43. As indicated by the legends in the drawing, energization of a series circuit including armature 41 and field winding 42 causes rotation of the armature 41 in a direction to close the throttle and to move the slider 38 of follow-up potentiometer 37 to the right along resistance 40. On the other hand, energization of armature 41 and field winding 43 causes rotation of motor 34 in a direction to open the throttle 20 and to move the slider 38 to the left along resistance 40.

The waste gate 31 is driven by a motor generally indicated at 44 through a gear train 45. The motor 44 also drives a waste gate follow-up potentiometer 46, which comprises a slider 47 movable along a slidewire resistance element 48. The motor 44 is also of the direct current series wound type, and is provided with an armature 50 and a pair of field windings 51 and 52. As indicated by the legend in the drawing, when the armature 50 and field winding 51 are both energized, the armature 50 rotates in a direction to drive the waste gate towards its open position and to move the slider 47 to the right along resistance element 48. On the other hand, when the armature 50 and field winding 52 are energized, the armature 50 rotates in a direction to close the waste gate 31 and to move the slider 47 to the left along resistance 48.

The energization of motors 34 and 44 is controlled by an electronic amplifier 53 and a cycling switch arrangement which includes a continuously running motor 54, cams 55, 56, 57 and 58 driven thereby, and switches 60, 61, 62 and 63 operated by the respective cams.

The amplifier 53 may be of any suitable type. For example, I may use an amplifier of the type described in Figure 2 of the co-pending application of Albert P. Upton, Serial No. 437,561, dated April 3, 1942, since matured into Patent No.

2,423,534, issued July 8, 1947. The amplifier 53 includes a pair of relays 64 and 65. The relay 64 comprises a winding 66 which controls the movement of a switch arm 67 cooperating with a stationary contact 68, with which it is engaged when the winding 66 is energized. Similarly, the relay 65 includes a winding 70 which controls the movement of a switch arm 71 cooperating with a stationary contact 72, with which it is engaged when the winding 70 is energized. As explained in the Upton application previously referred to, the windings 66 and 70 are selectively energized by the amplifier 53, in accordance with the phase of an alternating electrical signal potential applied to input terminals 73 and 74 of amplifier 53. The amplifier 53 is supplied with electrical energy from an alternating current source through a transformer 75, whose secondary winding is connected to power input terminals 76 and 77 of amplifier 53.

The switch 60 comprises a switch arm 80 movable between an upper stationary contact 81 and a lower stationary contact 82. The switch 61 comprises a switch arm 83 movable between an upper stationary contact 84 and a lower stationary contact 85. The switch 62 includes a switch arm 86 movable between an upper stationary contact 87 and a lower stationary contact 88. The switch 63 includes a switch arm 90 movable between an upper stationary contact 91 and a lower stationary contact 92.

It should be readily apparent from an inspection of the drawing, that as the motor 54 rotates the cams 55, 56, 57 and 58, the switches 60, 61, 62 and 63 are so operated that each switch arm engages its associated upper stationary contact during one-half revolution of the cam, and engages its lower stationary contact during the other half revolution of the cam.

Only the switches 60 and 61 are concerned in the energizing circuits for the motors 34 and 44. When the cams 55 and 56 are in a position such as that shown in the drawing, wherein the switch arms 80 and 83 engage their respective upper stationary contacts 81 and 84, the waste gate motor 44 is under the control of the relays 64 and 65 in the amplifier 53. At such a time, an energizing circuit for field winding 51 and armature 50 of motor 44 may be traced from the left-hand terminal of a battery 93, conductors 94 and 95, switch arm 71, contact 72, a conductor 96, switch arm 80, contact 81, a conductor 97, field winding 51, armature 50, and ground connections 98 and 100 to the opposite terminal of battery 93. Similarly, an energizing circuit for field winding 52 and armature 50 may be traced from the left-hand terminal of battery 93, through conductors 94 and 101, switch arm 67, contact 68, conductor 102, switch arm 83, contact 84, a conductor 103, field winding 52, armature 50, and ground connections 98 and 100 to the right-hand terminal of battery 93. It may therefore be seen that at such a time, the armature 50 of motor 44 is rotated in a direction dependent upon the phase of an alternating signal potential impressed on the input terminals 73 and 74 of amplifier 53.

During the half revolution of cams 55 and 56 when the switch arms 80 and 83 engage their respective lower stationary contacts 82 and 85, the waste gate motor 44 is no longer under control of amplifier 53, which instead controls throttle motor 34. At such a time, an energizing circuit for field winding 42 and armature 41 of motor 34 may be traced from the left-hand terminal of battery 93 through conductors 94 and 95, switch arm 71, contact 72, conductor 96, switch arm 80, contact 82, a conductor 104, field winding 42, armature 41, and ground connections 105 and 100 to the right-hand terminal of battery 93. Similarly, an energizing circuit for field winding 43 and armature 41 may be traced from the left-hand terminal of battery 93 through conductors 94 and 101, switch arm 67, contact 68, conductor 102, switch arm 83, contact 85, a conductor 106, field winding 43, armature 41, and ground connections 105 and 100 to the right-hand terminal of battery 93. Since the relays 64 and 65 of amplifier 53 are selectively energized in accordance with the phase of an alternating signal applied to input terminals 73 and 74, it may be seen that the motor 34 is rotated in a direction dependent upon the phase of the signal applied to those input terminals.

The input terminals 73 and 74 of amplifier 53 are supplied with an alternating signal potential of a given phase or of the opposite phase, depending upon the direction of unbalance of an electrical network of the Wheatstone bridge type, having a pair of input terminals 110 and 111, and three output terminals 112, 113 and 114. This bridge circuit is supplied with electrical energy from a transformer 115 whose secondary winding is connected to the input terminals 110 and 111 through conductors 116 and 117, respectively.

The upper left arm of the bridge circuit, as it appears in the drawing, connects input terminal 110 with output terminal 112, and may be traced from input terminal 110 through a conductor 118, contact 91, switch arm 90, a conductor 120, a slider 121 and a portion of a cooperating resistance element 122, a conductor 123, a slider 124, a resistance element 125 and a contact 126 which cooperate with slider 124, a conductor 127, a slider 128, a resistance element 130 which cooperates with slider 128, a conductor 131, a slidewire resistance element 132 and a slider 133 which cooperates therewith to output terminal 112, which is located on slider 133.

The upper right arm of the bridge circuit, as it appears in the drawing, connects the input terminal 111 with output terminal 112. This arm may be traced from input terminal 111, through a conductor 134, a fixed resistance 135, a conductor 136, a portion of resistance 132 and slider 133 to output terminal 112.

The bridge output terminal 112 is connected through a conductor 137 to the input terminal 74 of amplifier 53. Bridge output terminal 113 is connected through a conductor 138 to upper stationary contact 87 of switch 62. Output terminal 114 is connected through a conductor 140 to lower stationary contact 88 of switch 62. When switch arm 86 engages the upper terminal 87, then terminal 113 serves as the output terminal of the bridge circuit, and when switch arm 86 engages contact 88, then terminal 114 serves as the output terminal of the bridge circuit. Either output terminal 113 or 114, depending upon the position of switch arm 86, is connected through switch arm 86 and a conductor 141 to one terminal of a resistance element 142 whose opposite terminal is connected to the conductor 137. A tap 143 movable along resistance 142 is connected directly to input terminal 73 of amplifier 53.

Since, when the parts are in the positions shown in the drawing, the terminal 113 is acting as the second output terminal of the bridge circuit, the lower left arm of the bridge circuit may be considered as including those elements which interconnect input terminal 110 with output terminal 113. This lower left arm may therefore be traced from input terminal 110 through a fixed resistance 144, a conductor 145, resistance 48 and the slider 46 to output terminal 113. Similarly, the lower right arm of the bridge circuit may be traced from input terminal 111 through a fixed resistance 146, a conductor 147, resistance element 40, a conductor 148, and slider 47 to output terminal 113.

A variable resistance 150 is connected in parallel with the resistance 48. Adjustment of resistance 150 determines the total potential drop across resistance 48, and hence determines the potential drop per unit length of resistance 48. Similarly, a variable resistance 151 is connected in parallel with the resistance 40 of the throttle follow-up potentiometer 37.

The slider 133 and resistance element 132 together form a control potentiometer 152. The slider 133 is moved along the resistance 132 in accordance with the absolute pressure existing in the intake manifold 21. A flexible bellows 153 has its interior connected through a tube 154 with the intake manifold 21, so that the pressure existing inside the manifold 21 is transmitted to the inside of the bellows 153. One end of the bellows 153 is fixed, and its other end is connected through a link 155 to the slider 133. Another bellows 156 is evacuated. The bellows 156 is also fixed at one end, and its free end is connected to the end of link 155 opposite the bellows 153. Atmospheric pressure exists adjacent the outside surfaces of both bellows 153 and 156. When a change in atmospheric pressure occurs, the forces produced by the two bellows on the link 155 oppose each other, so that no motion of slider 133 results. However, if the pressure in the intake manifold 21 changes, the bellows 153 expands or contracts without opposition from bellows 156 other than that caused by its normal spring rate, and the slider 133 is moved over the resistance 132. Therefore it may be seen that the position of slider 133 with respect to resistance 132 is a measure of the absolute pressure existing within the intake manifold 21.

The slider 128 and the resistance element 130 together form a compensating controller 160. The slider 128 is movable along resistance 130 by means of a bellows 161, whose interior is connected by a tube 162 to the exhaust manifold 28. The bellows 161 is fixed at one end, and its opposite end is connected by a link 163 to the slider 128. An evacuated bellows 157 acts on the opposite end of link 163 to compensate the action of bellows 161 for variations in atmospheric pressure, in the same manner that evacuated bellows 156 compensates the action of bellows 153, as described above. Since the interior of bellows 161 is supplied with pressure from the exhaust manifold 28, and its action is compensated for variations in atmospheric pressure, by means of bellows 157, it may be stated that the position of slider 128 is a measure of the absolute pressure existing in the exhaust manifold 28. This pressure differential is in turn a measure of the power being delivered to the turbine. The slider 128 is biased into engagement with a stop 164 by a spring 172. The tension of spring 172 may be adjusted by rotation of a screw 173 which threadedly engages a stationary member 174. Adjustment of screw 173 determines the particular value of pressure in the exhaust manifold 28 at which the controller 160 begins to insert resistance in the bridge circuit. During the normal range of pressure in the exhaust manifold 28, the slider 128 rests against stop 164 at the right end of its range of movement. At such a time, none of the resistance 130 is connected in the upper left arm of the bridge circuit. When the exhaust back pressure increases to a value which represents the top safe back pressure for reliable engine operation, the bellows 161 starts to move the slider 128 across resistance 130, thereby inserting part of the resistance 130 in the bridge circuit.

The slider 124 and the cooperating resistance element 125 and contact 126 together form a second compensating controller 165. The slider 124 is moved along contact strip 126 and resistance 125 by a governor device schematically indicated at 166, in accordance with the speed of shaft 19 of turbine 13. The governor 166 and the controller 165 are so related that in the normal speed range of the turbine, the slider 124 engages the contact strip 126, and hence introduces no resistance into the bridge circuit. As the shaft 19 approaches its limiting speed, the governor 166 moves the slider 124 along the resistance 125 to insert an increasing amount of resistance into the bridge circuit.

The slider 121 is movable along resistance 122 by a manually operable knob 169. The knob 169, slider 121 and resistance 122 together form a control point adjuster 167. This device is located in a position where it may be controlled by the pilot or some other member of the crew of the aircraft. Movement of slider 121 by means of knob 169 determines the value of the pressure within the intake manifold 21 which the system will maintain.

When cam 58 is in such a position that switch arm 90 of switch 63 engages the lower stationary contact 92, the upper left arm of the bridge circuit may be traced from input terminal 110 through a portion of conductor 118, a normally closed switch 168, a conductor 170, and lower stationary contact 92 to switch arm 90, and hence as before to output terminal 112 of the bridge circuit. When the switch 168 is open, this portion of the bridge circuit also includes a variable resistance 171, which is normally shunted by the switch 168. The switch 168 may be manually operated, or it may be automatically operated by a device 174 responsive to the presence of icing conditions. One such device suitable for this purpose is the one disclosed in the co-pending application of Waldo H. Kliever, Serial No. 463,259, filed October 24, 1942, since issued as Patent No. 2,432,669, dated Dec. 16, 1947. The switch 168 of the present application may be for example the switch 133 of Figure 14 of the Kliever application. If any other ice detecting mechanism is employed, the switch 168 will be actuated by any element thereof movable in accordance with the presence or absence of ice or ice producing conditions.

Operation of Figure 1

From the foregoing description it should be understood that the bridge circuit, through the amplifier 53, alternately controls first the waste gate motor 44 and then the throttle motor 34. This alternate control of the two motors is effected by operation of the switches 60 and 61 by the continuously running motor 54. Furthermore, because of the operation of the switch 62, when the amplifier 53 controls the waste gate motor 44, the potential difference between output terminals 112 and 113 is impressed on the amplifier input terminal. On the other hand, when the amplifier controls the throttle motor 34, the potential difference between the output terminals 112 and 114 is impressed on the amplifier input terminal.

Consider first the condition existing when the amplifier 53 is controlling the throttle motor 34. Assume that the pressure in the intake manifold is such that the bridge circuit is balanced when the throttle is half way open, and the throttle follow-up potentiometer 37 is therefore in its center position, as shown in the drawing. The bridge circuit is said to be balanced when no potential difference exists between the output terminals, in this case, terminals 112 and 114. When no potential difference exists between these terminals, no potential is impressed on the input terminals 73 and 74 on the amplifier 53. Hence neither of the relays 64 and 65 is energized, and the throttle motor therefore remains stationary.

With the same conditions existing in the system, consider the operation which takes place when the amplifier 53 is controlling the waste gate motor 44. At such a time, the potential difference between output terminal 112 and output terminal 113 is impressed on the input terminal of amplifier 53. Since slider 38 is at the same potential as input terminal 112, the potential then impressed on the amplifier input terminal is equal to the potential drop along the resistance 40 between the slider 38 and the left terminal of resistance 40.

For the sake of convenience in describing the operation of this system, consider that the operation is taking place during a half cycle when a left end of the secondary winding of the transformer 115 is positive, and its right terminal is negative. During the alternate half cycles, the polarity of any specific potential is opposite to that described.

It will therefore be seen that, with the various parts in the positions shown in the drawing, the difference of potential between output terminals 112 and 113 of the bridge circuit is of a polarity such that terminal 113 is positive with respect to terminal 112. As this potential is applied to the input terminals of amplifier 53, its polarity is such that input terminal 73 is positive with respect to input terminal 74. The amplifier 53 is so connected that it responds to a potential of this polarity, or phase, by energizing winding 70 of relay 65. Energization of winding 70 causes switch arm 71 to engage contact 72, thereby completing the energizing circuit, previously traced, for field winding 51 and armature 50 of waste gate motor 44. Energization of this field winding and the armature causes the motor 44 to run in a direction to open the waste gate. However, the waste gate is already fully open, and the waste gate follow-up potentiometer 46 has reached the limit of its movement in the gate opening direction. Therefore the motor 44 is merely stalled against a stop (not shown) associated with the waste gate, and no operation of the control system results.

It may therefore be seen that as long as the intake manifold pressure remains at the value which the system has been set to maintain, the waste gate and throttle remain at the positions indicated by the positions of their respective follow-up potentiometers in the drawing.

Now let it be assumed that the pressure in the intake manifold steadily decreases, such as might occur if the aircraft climbs steadily to gain altitude. The decrease in pressure in the intake manifold causes the bellows 153 to contract, thereby moving the slider 133 to the left across resistance 132. The potential of output terminal 112 then becomes more positive than the potential of output terminal 114. Therefore, during the time when the amplifier 53 is in control of the throttle motor, a potential is impressed on the input terminals 73 and 74 of a polarity such that terminal 74 is positive with respect to terminal 73. When a potential of this polarity is applied to the amplifier input terminals, the amplifier responds to energize relay winding 66 of relay 64. Energization of relay 64 causes the completion of an energizing circuit for field winding 43 and armature 41 of throttle motor 34. The motor then operates in a direction to open the throttle and to move the slider 38 to the left along resistance 40. As a result of this opening movement of the throttle, the intake manifold pressure is increased to restore it toward its original condition, and at the same time the throttle follow-up potentiometer 37 is operated to reduce the unbalance potential of the bridge circuit.

If the pressure in the intake manifold 21 continues to decrease after the throttle is fully open, the field winding 43 of throttle motor 34 continues to be energized each time that the throttle motor is placed under control of amplifier 53. Since the throttle has reached its fully open position, the motor 34 stalls against a stop, not shown in the drawing, associated with the throttle mechanism. However, when the throttle is fully open and the pressure in the intake manifold continues to decrease, then, during each time that the amplifier 53 controls the waste gate motor 44, a signal is applied to the input terminals of amplifier 53 of a polarity such as to cause energization of relay 64. This causes energization of winding 52 and armature 50 of waste gate motor 44, running the motor in a direction to close the waste gate and to move the slider 47 to the left along resistance 48 so as to rebalance the bridge circuit. It may therefore be seen that, for a given setting of the control point adjuster 167, the positions of the throttle and waste gate bear a definite predetermined relation to the pressure in the intake manifold, and that for each change in the intake manifold pressure a proportionate change takes place in either the throttle or waste gate positions. In other words, the throttle and waste gate are controlled in a modulating manner.

Closure of the waste gate 31 increases the pressure differential across the turbine 13, and thereby causes the turbine to rotate, driving the compressor to increase the pressure of the air supplied to the intake manifold. If the pressure in the intake manifold continues to decrease due to increasing altitude of the aircraft, the waste gate is closed more and more, thereby increasing the pressure differential across the turbine, increasing the turbine and compressor speed, and hence the compression ratio of the compressor so as to restore the pressure in the intake manifold to its desired value.

Conversely, it should be apparent from the foregoing that upon a continued increase in intake manifold pressure, the system first moves the waste gate to fully open position, thereby stopping the compressor, and then starts closing the throttle.

The compensating controller 160 acts to introduce resistance into the upper left arm of the bridge circuit whenever the pressure in the exhaust manifold rises above a predetermined value. The purpose of this controller is to prevent the exhaust manifold pressure from rising to a value where it might seriously interfere with the efficient operation of the engine. It is possible that the control system, in attempting to maintain the intake manifold pressure at a predetermined value, might close the waste gate so far that the exhaust pressure would increase to a point where it interfered with efficient engine operation. The compensating controller 160 prevents such a condition from occurring. When the controller 160 acts, upon an increase in exhaust pressure, to introduce resistance into the upper left arm of the bridge, the bridge is thereby unbalanced in the same sense as if an increase in the intake manifold pressure had occurred. The system responds to such an unbalance by opening the waste gate sufficiently to relieve the pressure in the exhaust manifold.

It is desirable to provide means for preventing overspeeding of the turbine. Such a means is provided in the compensating controller 165, which is operated by a governor device 166 to increase the resistance in the upper left arm of the bridge circuit when the speed of the turbine 13 exceeds a predetermined value. As previously described, upon such an unbalance of the bridge circuit, the system responds to open the waste gate and lower the manifold pressure the correct amount as dictated by the top safe speed of the turbine.

The position of slider 133 of control potentiometer 152 should accurately reflect the pressure in the intake manifold as that pressure varies over a wide range. It has been found in practice that a range of from 17 to 46 inches of mercury includes most pressure conditions encountered. The control potentiometer 152 should therefore be constructed so that a variation in pressure of 29 inches of mercury causes movement of the slider 133 from the right extremity of the resistance 132 to the left extremity. It is generally desirable to maintain the intake manifold pressure in a range, hereinafter termed the "throttling" range, which lies within one inch of mercury more or less of any selected pressure within the wide range. The throttle and waste gate should therefore be sequentially moved throughout their full range as the intake manifold pressure varies through an operating range of two inches of mercury. In order to secure such operation, total effective resistance of the slide-wires 40 and 48 and their respective parallel resistance 151 and 150 should be 2/29 of the resistance of element 132. The throttling range, or the range within which the system will maintain the manifold pressure, may be adjusted by varying the resistances 150 and 151, so as to vary the total effective resistance between the opposite terminals of the two follow-up potentiometers in proportion to the resistance of element 132. Furthermore, by relatively varying the two resistances 150 and 151, the proportion of the total throttling range during which the throttle is moved may be varied with respect to the portion of the total throttling range during which the waste gate is controlled. For example, under certain conditions, it may be desired to move the throttle from full closed to full open position as the intake manifold pressure varies over a range of one inch of mercury, and after the throttle is fully opened to move the waste gate from full open to full closed position as the pressure is varied further over another inch of mercury. On the other hand, it may be desirable to move the throttle from full closed to full open position as the intake manifold pressure varies over only ½ inch of mercury, and thereafter to move the waste gate from fully open to fully closed position as the manifold pressure varies further over a range of 1½ inches of mercury. A change from one of these modes of operation to the other may be accomplished by varying the resistances 150 and 151 from a first setting in which the total resistance of the two elements 150 and 48 equals that of the two elements 151 and 40 to a second setting in which the total resistance of the elements 150 and 48 is three times that of the two elements 151 and 40.

In order that the pilot may move the throttling range of two inches to any part of the wide range of 29 inches of mercury over which the system can operate, the resistance of element 122 should be chosen so that its effect on the bridge circuit is comparable to that of control resistance 132. The compensating controller 160 should have its resistance 130 so proportioned that it will introduce resistance into the bridge circuit at a rate which will effect the desired control of exhaust back pressure.

The resistance 125 in the compensating controller 165 should be relatively high, so that it will be effective to absolutely prevent increases in speed of the turbine 13 above a predetermined limiting value.

The most efficient method of operation of the throttle and waste gate is to first open the throttle wide and then to gradually close the waste gate in order to increase the intake manifold pressure. This mode of operation may be termed sequential control of the throttle and waste gate. It may sometimes be desirable, however, to control the throttle and waste gate overlappingly rather than sequentially. More specifically, it may be desired to partially close the throttle and at the same time close the waste gate partially so as to increase the compression ratio of the compressor, thereby increasing the temperature of the air supplied to the carburetor due to the heat of compression. The latter mode of operation is especially desirable when the temperature conditions are such that there is a possibility of the formation of ice in the carburetor. I have therefore provided in the system of Figure 1, means whereby this latter mode of operation may be accomplished. The switch 168 is normally closed, and when so closed, the throttle and waste gate are operated sequentially toward their pressure increasing position, as described above. When the switch 168 is opened, which may either be done manually, or at the command of some device responsive to the presence of icing conditions, the resistance 171 is inserted in the upper left arm of the bridge circuit each time that the amplifier 53 is controlling the throttle motor 34. This increased resistance in the upper left arm of the bridge circuit causes a change in its output potential of the same nature as that which would occur upon an increase in pressure in the intake manifold. Therefore the amplifier 53 responds to this potential by energizing field winding 42 and armature 41 of the throttle motor, so as to run the throttle toward closed position. This movement of the throttle causes a decrease in the pressure in the intake manifold, so that when the system is next put in control of the waste gate motor, the bridge circuit is unbalanced in a direction which causes the waste gate to close by an additional amount, thereby increasing the speed of the turbine and hence the compression ratio of the compressor. When the compression ratio is increased the temperature of the air supplied to the carburetor is increased, so as to melt any ice which may have formed there and to prevent the formation of further ice. Also, the resulting increase in pressure restores the intake manifold pressure to its desired value. Therefore, the system accomplishes a pressure decreasing movement of the throttle and a compensating pressure increasing movement of the waste gate, so that the pressure in the intake manifold is maintained substantially constant, but the temperature of the air supplied to the carburetor is materially increased. By adjusting the resistance 171, the amount of the pressure decreasing movement of the throttle, and hence the corresponding pressure increasing movement of the waste gate may be controlled within the limits of allowable exhaust back pressure as controlled by compensator 160. In this manner, the amount of heat supplied to the carburetor for de-icing purposes may be varied in accordance with the severity of the icing conditions encountered. It is in connection with this deicing operation that the compensator 160 is particularly valuable, since the exhaust pressure is at such times more apt to rise to undesired values.

Summarizing the operation of the system of Figure 1, the throttle motor and the waste gate motor are sequentially controlled in response to the pressure in the intake manifold, in such a manner as to maintain the intake manifold pressure within a predetermined range of values. Means are provided, which respond to the exhaust back pressure to prevent that exhaust back pressure from increasing sufficiently to cause damage to the engine, even though a reduction in the intake manifold pressure may be required to produce this result. Further means are provided, which respond directly to the speed of the turbine to modify the control of the waste gate so as to prevent it from reaching an unsafe speed. Means are also provided to control the throttle and waste gate motors overlappingly instead of sequentially, so as to take advantage of the heat of compression of the air passing through the compressor to prevent the formation of ice in the carburetor. This last means may be operated either manually by the pilot or automatically at the command of a device responsive to the presence of icing conditions in the atmosphere or in the carburetor itself. Thus, the present apparatus includes means responsive to engine operating variables and means controlled thereby for maintaining or changing the values of said variables.

*Figure 2*

In Figure 2 is shown a modification of the control system of Figure 1. In the system of Figure 2, the engine, its combustion air supply system, and its exhaust gas discharge system are the same as in Figure 1. Also, the bridge circuit and the motors which control the throttle and waste gate are substantially the same as in the system of Figure 1. The means by which the unbalance of the bridge circuit controls the throttle and waste gate motors is quite different however, and a different method of introducing overlapping operation of the throttle and waste gate to prevent icing in the carburetor is shown. Those elements in the system of Figure 2 which are the same as corresponding elements of Figure 1 have been given the same reference character, and will not be further described in detail. Elements of the system of Figure 2 which are different from any shown in the system of Figure 1 have been given reference characters in the 200's.

Referring to the bridge circuit of Figure 2, it may be seen that this is substantially identical with the bridge circuit of Figure 1, the only difference being that the conductor 120 now connects slider 121 of the control point adjuster 167 directly to the input terminal 110 of the bridge circuit. The switches 63 and 168 and resistance 71 are not present in the circuit of Figure 2.

Instead of a single amplifier and cyclically operated switching means for alternately transferring the amplifier from control of the waste gate motor to control of the throttle motor, there are provided in the system of Figure 2 two separate amplifiers, one for controlling the waste gate motor and one for controlling the throttle motor. The waste gate amplifier is numbered 200 in the drawing and the throttle amplifier is numbered 235. Each of the amplifiers 200 and 235 may be of the same type as the amplifier 53 of Figure 1. The waste gate amplifier 200 has a pair of input terminals 201 and 202. The input terminal 202 is connected through a conductor 203 and a conductor 204 to bridge output terminal 112. The conductor 203 is connected through a resistance 205, a condenser 206, and a conductor 207 to bridge output terminal 113. A tap 208 associated with resistance 205 is connected directly to amplifier input terminal 201. It may therefore be seen that any alternating potential occurring between bridge output terminals 112 and 113 is impressed through condenser 206 across resistance 205. A portion of this potential, depending upon the position of tap 208, is impressed on the input terminals 201 and 202 of waste gate amplifier 200. The amplifier 200 is supplied with electrical energy from a transformer 212, and includes a pair of relays 210 and 211, which are selectively energized in accordance with the phase of the potential supplied to the input terminals 201 and 202. The relay 210 controls the position of a switch arm 213 which cooperates with a stationary contact 214 in such a manner that the switch arm engages the contact when the relay is energized. Similarly, the relay 211 controls the position of a switch arm 215 which cooperates with a stationary contact 216 in such a manner that the switch arm engages the contact when the relay is energized.

Switch arm 213 controls an energizing circuit for field winding 51 and armature 50 of motor 44, which circuit may be traced from the left-hand terminal of a battery 217 through conductors 218 and 220, a stationary contact 221, a switch blade 222, a conductor 223, switch arm 213, contact 214, a conductor 224, a contact 225 and its associated switch blade 226, a conductor 227, field winding 51, armature 50, and ground connections 228 and 230 to the opposite terminal of battery 217.

The relay 211 controls an energizing circuit for field winding 52 and armature 50 of motor 44, which circuit may be traced from the left terminal of battery 217 through conductors 218 and 220, contact 221, switch blade 222, conductor 223, switch arm 215, contact 216, conductor 231, stationary contact 232 and its associated switch blade 233, a conductor 234, field winding 52, armature 50, and ground connections 228 and 230 to the right hand terminal of battery 217.

The throttle amplifier 235 has a pair of input terminals 236 and 237. The input terminal 237 is connected through a conductor 238 and conductor 204 to output terminal 112 of the bridge circuit. Conductor 238 is connected through a resistance 240, a condenser 241, a conductor 242, contacts 271 and 272 of a normally closed switch 243, and a conductor 244 to output terminal 114 of the bridge circuit. It may be seen that any potential difference occurring between output terminals 112 and 114 of the bridge circuit is impressed through condenser 241 across the resistance 240. A portion of this potential, depending upon the position of a tap 245 associated with the resistance 240 is applied to the input terminals 236 and 237 of amplifier 235. The amplifier 235 is supplied with electrical energy from a transformer 246, and includes a pair of relays 247 and 248, which are selectively energized depending upon the phase of the electrical potential supplied to the input terminals of the amplifier. Relay 247 controls the movements of a switch arm 250 with respect to a stationary contact 251. Relay 248 controls the movements of a switch arm 252 with respect to a stationary contact 253. Switch arm 250 controls an energizing circuit for winding 42 and armature 41 of throttle motor 34. This circuit may be traced from the left-hand terminal of battery 217 through switch arm 250, contact 251, a conductor 254, a contact 255 and its associated switch blade 256, a conductor 257, field winding 42, armature 41, and ground connections 258 and 230 to the opposite terminal of battery 217.

The switch arm 252 controls an energizing circuit for field winding 43 and armature 41 of motor 34, which may be traced from the left-hand terminal of battery 217 through switch arm 252, contact 253, a conductor 260, a stationary contact 261 and its associated switch blade 262, a conductor 263, field winding 43, armature 41, and ground connections 258 and 230 to the right-hand terminal of battery 217.

The contact 225 and the switch blade 226 together comprise a limit switch 264 which is biased to closed position, and is operated to open position by an extension 265 on slider 47 when the waste gate reaches its fully open position. The contact 232 and the switch blade 233 comprise a limit switch 266 which is biased to closed position, and is opened by the extension 265 on blade 47 when the waste gate 31 reaches its fully closed position.

The contact 255 and the associated switch blade 256 together form a limit switch 267, which is operated by an extension 268 on slider 38 when the throttle reaches its closed position. The contact 261 and switch blade 262, and the contact 221 and switch blade 222 together form a dual switch 270. The switch 270 is biased to the position shown in the drawing, in which blade 262 engages contact 261 and blade 222 is spaced from contact 221. The dual switch 270 is operable by engagement of extension 268 with switch blade 262 when the throttle moves to its fully open position, so that the switch blade 262 is disengaged from contact 261 and switch blade 222 is moved into engagement with contact 221. The switch blade 262 and contact 261 serve as a limit switch in the energizing circuit for winding 43 of motor 34, while the switch blade 222 and contact 221 serve as a transfer switch to put the bridge circuit in control of the waste gate motor when the throttle reaches its fully open position.

Each of the four limit switches 264, 266, 267, and 261, 262 function to open one of the motor energizing circuits so as to prevent further energization of the motor for operation in a given direction after the device driven by the motor has reached its limiting position in that direction. This prevents waste of electrical energy due to such useless energization of the motor windings, and also prevents strain on the mechanical parts driven by the motor, and adverse effects due to heating of the motor windings.

The transfer switch 221, 222 in dual switch 270 serves to prevent any energization of the waste gate motor as long as the throttle is in any position except its fully open position.

When the switch 243 is in the position shown in the drawing, it completes a circuit between contacts 271 and 272, as previously described. When it is moved to the right from the position shown in the drawing, it completes a circuit between contact 273 and 274, thereby shunting the transfer switch 221, 222 in the dual switch 270.

The switch 243 may be manually operated, or may be operated by some device 274 responsive to the presence of ice forming conditions, such as the device shown in the co-pending Kliever application previously referred to.

A bridge circuit 275 has fixed resistances 276, 277 and 278 in three of its arms, and in its fourth arm is a resistance element 280, of nickel or some other material having an appreciable temperature coefficient of resistance. The resistance element 280 is located in the path of the air entering the carburetor 17. The bridge circuit 275 is supplied with electrical energy from a transformer secondary winding 281. The resistance elements 276, 277, 278 and 280 are so proportioned that the bridge circuit 275 is balanced when the temperature of the air in the carburetor is approximately 90° F. The output terminals of bridge 275 are connected through conductors 282 and 283 respectively to the switch contacts 271 and 272. When the switch 243 is in the position shown in the drawing, the contacts 271 and 272 are shunted and the output potential of the bridge 275 has no effect on the control system. When the switch 243 is moved to the right from the position shown in the drawing however, the output potential of bridge 275 is connected in series with the potential between output terminals 112 and 114 of the main bridge. The transformer 115 and transformer secondary winding 281 are supplied with electrical energy from the same source, so that the output potential of the two bridges are either in phase with each other, or opposite each other in phase. Hence the potential supplied to the input terminals 236 and 237 of the throttle amplifier 235 is a portion of the algebraic sum of these two bridge output potentials. The polarity, or phase, of the output potential of bridge 275 is such that when the carburetor air temperature is below 35°, it introduces a signal into the throttle amplifier of a phase such as to cause the amplifier to energize relay 247, thereby operating the throttle towards closed position.

*Operation of Figure 2*

When the parts are in the position shown in the drawing, the waste gate is fully open, and the throttle is half-way open, as indicated by the positions of the follow-up potentiometers 47 and 37, respectively. The transfer switch 221, 222 is then opened, so that the waste gate amplifier 200 does not control the motor 44. The throttle amplifier 235 and hence the throttle motor 34, is under control of the main bridge circuit, but the carburetor temperature responsive bridge circuit 275 is shunted by the switch 243.

Under these conditions, let it be assumed that the pressure in the intake manifold 21 decreases gradually from the value determined by the setting of the control point adjuster 167. Because of this decrease in pressure, the bellows 153 collapses, moving the slider 112 to the left along resistance 132. A potential difference is thereby created between output terminals 112 and 114 of the bridge circuit, which is impressed on the input terminals of the throttle amplifier 235, and which is of the proper phase so that the amplifier energizes the relay 248, thereby moving switch arm 252 into engagement with contact 253 and completing the energizing circuit for field winding 43 and armature 41 of throttle motor 34, previously traced. This energization of motor 34 drives the throttle toward open position and moves the slider to the left along resistance 40. As the intake manifold pressure continues to decrease, the throttle is opened wider until it reaches its fully open position. When the latter position is reached, the extension 268 on slider 38 engages switch blade 262, thereby opening the limit switch in the circuit of field winding 43, and operating the transfer switch 221, 222 to place the waste gate motor 44 under control of the main bridge circuit. Thereafter, if the pressure in the intake manifold continues to decrease, the waste gate amplifier 200 responds to the unbalance of the bridge circuit to cause energization of field winding 52 and armature 50 of motor 44. Such energization of motor 44 drives the waste gate towards its closed position, thereby increasing the pressure differential across the turbine 13 and causing operation of the compressor 12 to increase the intake manifold pressure.

Upon an increase in intake manifold pressure, the system first operates the waste gate to its fully open position, thereby stopping the compression, and then gradually closes the throttle.

When the switch 243 has been moved to its right-hand position, and the temperature in the carburetor 17 is below 35°, a signal is introduced into the input circuit of amplifier 235 in the proper sense to cause throttle motor 34 to drive the throttle towards closed position. This decreases the pressure in the intake manifold, causing a response of the waste gate motor to drive the waste gate toward its closed position, thereby restoring the pressure in the intake manifold to its desired value, and utilizing the heat of compression of the air passing through the compressor 12 to raise the temperature in the carburetor 17. It should be noted that the waste gate motor is always under control of the bridge circuit when the switch 243 is operated to its right-hand position, regardless of the position of the throttle at that time.

When the system has been operating the waste gate and throttle overlappingly, and the switch 243 is operated to its left-hand position, it is possible that the waste gate may be left in an intermediate position, from which it cannot move because the transfer switch 221, 222 is open, since the throttle is also in an intermediate position. To overcome such a condition, the pilot should, after operation of the switch 243 to its left position, operate the control point selector 167 in a pressure increasing direction far enough to open the throttle wide, thereby placing the waste gate under control of the bridge. The pilot may then restore the control point selector to its previous position, and the system will respond by opening the waste gate wide and then closing the throttle.

Figure 2A

If desired, transfer switch 221, 222 and switch contacts 273, 274 may be omitted and replaced by a direct connection between conductors 218 and 223. If this were done the operation of the system during transfer from sequential to overlapping operation would be completely automatic. This arrangement is shown in Figure 2A.

Figure 3

In Figure 3 I have shown a simplified modification of the control system illustrated in Figure 1, in which only the supercharger waste gate is controlled automatically, the throttle being under manual control. In this modification, the compensating controller 165 which is operated in accordance with the speed of the turbine is omitted. In this modification also, I have shown an arrangement whereby the waste gate motor may be controlled either automatically in accordance with the carburetor intake pressure, or manually by the pilot.

In Figure 3, the engine, its intake and exhaust system, and the main bridge circuit are substantially the same as those in the previous figures, and the elements in Figure 3 which correspond to similar elements in Figure 1 have been given the same reference numerals. Those elements in Figure 3 which do not correspond to any element in Figure 1 have been given reference numerals in the 300 series.

Referring to Figure 3, it may be seen that the throttle 20 is controlled by a manual lever 300, through a linkage not shown in the drawing. The waste gate motor 44 is controlled by an amplifier 301, which may be of the same type as the amplifier 53 of Figure 1. The amplifier 301 has input terminals 302 and 303, which are connected through conductors 304 and 305, respectively, to the bridge output terminals 112 and 113. The amplifier 301 is supplied with electrical energy through a transformer 308, and includes a pair of relays 306 and 307 which are selectively energized in accordance with the phase of an alternating signal potential applied to the input terminals 302 and 303.

The relay 306 controls the movements of a switch arm 310 which cooperates with a stationary contact 311, and the relay 307 controls the movement of a switch arm 312 which cooperates with a stationary contact 313.

The switch arm 310 controls an energizing circuit for field winding 52 and armature 50 of motor 44, which circuit may be traced from the upper terminal of a battery 314, through a switch blade 315 of a manually operable switch 316, a contact 317, a conductor 318, switch arm 310, contact 311, a conductor 320, field winding 52, armature 50, and ground connections 321 and 322 to the lower terminal of battery 314.

The switch arm 312 controls an energizing circuit for field winding 51 and the armature 50 of motor 44, which may be traced from the upper terminal of battery 314 through switch blade 315, contact 317, conductor 318, switch arm 312, contact 313, a conductor 323, field winding 51, armature 50, and ground connections 321 and 322 to the lower terminal of battery 314.

The switch blade 315 is operable between the stationary contact 317 and a second stationary contact 324. The stationary contact 324 is connected through a conductor 325 to a switch blade 326 of a second manually operable switch 327. The switch 327 also includes a pair of stationary contacts 328 and 329, between which the switch blade 326 is movable.

When the switch 316 is operated so that switch blade 315 engages contact 317, the motor 44 is under control of the amplifier 301. When the switch blade 315 is moved into engagement with contact 324, the motor 44 is under control of the manually operable switch 327. If switch blade 315 is engaging contact 324, and switch blade 326 is moved into engagement with stationary contact 328, an energizing circuit is completed for field winding 52 and armature 50 of motor 44 which may be traced from the upper terminal of battery 314 through switch blade 315, contact 324, conductor 325, switch blade 326, contact 328, a conductor 331, field winding 52, armature 50, and ground connections 321 and 322 to the lower terminal of battery 314.

When switch blade 315 engages the contact 324, if switch blade 326 is moved into engagement with contact 329, an energizing circuit is completed for field winding 51 and armature 50 of motor 44 which may be traced from the upper terminal of battery 314 through switch blade 315, contact 324, conductor 325, switch blade 326, contact 329, a conductor 332, field winding 51, armature 50, and ground connections 321 and 322 to the lower terminal of battery 314.

It should be noted that in the system of Figure 3, the interior of bellows 153 is connected through a tube 335 to the carburetor 17 at a point on the upstream side of the throttle 20. In this manner, the control system is not affected by the position of the throttle 20. If the controller 152 were made responsive to pressure at a point on the downstream side of the throttle 20, then the waste gate 31 would try to operate so as to compensate for all changes in the intake manifold pressure caused by manual operation of the throttle 20, so that the pilot could not effectively change the intake manifold pressure by manipulation of the throttle 20.

From the foregoing description, it is believed clear that upon an increase in the pressure in the carburetor 17, the waste gate motor 44 is energized in a direction to open the waste gate and to move the slider 47 to the right to rebalance the bridge circuit. Conversely, upon a decrease in pressure in the carburetor 17, the waste gate motor 44 is energized for operation in a direction to close the waste gate so as to increase the speed of the compressor, thereby increasing its compression ratio and hence the pressure in the carburetor 17. In this example, as in the previous one, the control apparatus recited operates to maintain or change engine operating variables.

While I have shown and described certain preferred embodiments of my invention, other modifications thereof will readily occur to those skilled in the art, and I therefore wish my invention to be limited only by the appended claims.

I claim:

1. Apparatus for controlling an operating pressure of a combustion engine having at least one combustion chamber with valve means controlling the flow of one of the components of an ignitable mixture to said chamber, comprising in combination, a device responsive to intake pressure, a device responsive to outlet pressure, electrical motor means for reversibly positioning the valve means, and means reversibly energizing said motor means in accordance with changes in pressure in the intake of said chamber and changes in pressure in the outlet side of said chamber, said last named means comprising an electrical impedance network having a plurality of adjustable impedances, one of which is adapted to be positioned by said device responsive to intake pressure and another of which is adapted to be positioned by said device responsive to outlet pressure, and electrical amplifying means connected to said network and said motor to control the operation of said motor means in accordance with the adjustment of said impedances in said network.

2. Apparatus for controlling a combustion engine having at least one combustion chamber and a turbine driven by the products of combustion flowing from the chamber with valve means controlling the flow of one of the components of an ignitable mixture to said chamber, the combination comprising, electrical motor means for reversibly positioning the valve means, and means for reversibly energizing said motor in accordance with the speed of the turbine and magnitude of a further operating variable of said engine, said last named means comprising a balanceable electrical network of a proportioning type having a plurality of adjustable impedances, one of which is adapted to be adjusted by a device responsive to turbine speed and another of which is adapted to be positioned by a device responsive to said further variable, and electronic amplifying means connected to said network and said motor to energize said motor in accordance with the adjustment of said impedances in said network.

3. A system for controlling the pressure of the air supplied to the intake of a combustion engine having a compressor for supplying air to said intake, comprising in combination, means for controlling the compression ratio of said compressor, electrically controlled motor means for operating said ratio controlling means, a variable impedance device responsive to the pressure in the exhaust of said engine, said variable impedance device assuming a constant value of impedance over one range of variation of said exhaust pressure and operative over a second predetermined range of variation of exhaust pressure to vary its impedance, and means including said variable impedance device for controlling said motor means so that over said predetermined range of variation said ratio controlling means is operated proportionately to the value of said pressure.

4. An apparatus for controlling the pressure of the air supplied to the intake of a combustion engine having a compressor for supplying air to said intake, comprising in combination, means for controlling the compression ratio of said compressor, a single electrically controlled motor means for operating said ratio controlling means, a balanceable electrical impedance network having a plurality of adjustable impedances therein, a first device responsive to the pressure of the air in the intake connected to and positioning one of said impedances, a device responsive to the speed of said compressor for positioning another of said impedances, amplifying means connected to said network for detecting the unbalance thereof, and means connecting said amplifying means to said motor to reversibly energize the same in accordance with the electrical unbalance of said network.

5. Apparatus for controlling the pressure of the air supplied to the intake of a combustion engine having throttling means, a compressor for supplying air to said engine through said throttle, and means for controlling the compression ratio of said compressor, comprising in combination, a balanceable electrical control network in the form of a proportioning network having a plurality of adjustable impedances therein, first electrically controlled motor means for operating said throttle, second electrically controlled motor means for operating said ratio controlling means, both of said motor means adjusting separate impedances in said network in accordance with an electrical signal from said network, a control device responsive to the pressure in the intake of said engine, said control device adjusting a further impedance in said network and operating with said network in response to a unidirectional change in said pressure first to control one of said motor means in a modulating manner until the device operated thereby has reached a predetermined position, and thereafter to control the other of said motor means in a modulating manner.

6. Apparatus for controlling the pressure of the air supplied to the intake of a combustion engine having a throttle, a compressor for supplying air to said manifold through said throttle, and means for controlling the compression ratio of said compressor, comprising in combination, first motor means for operating said throttle, second motor means for operating said ratio controlling means, a balanceable electrical network, variable impedance means connected in said network, means responsive to the pressure of the air supplied by said compressor for varying said variable impedance means, said variable impedance means being capable of producing a relatively large range of unbalance in said network, first and second rebalancing means each capable of rebalancing said network throughout different portions of said range of unbalance, a driving connection between said first motor means and said first rebalancing means, means responsive to the potential difference between said first rebalancing means and another point in said network for controlling said first motor means, a driving connection between said second motor means and said second rebalancing means, and means responsive to the potential difference between said point and said second rebalancing means for controlling said second motor means.

7. Apparatus for controlling the pressure of the air supplied to the intake of a combustion engine, comprising in combination, a throttle, first motor means for operating said throttle, a compressor for supplying air to said intake through said throttle, which compressor incidentally heats the air passing through it, means for controlling the compression ratio of said compressor, second motor means for operating said compression ratio controlling means, a device responsive to the pressure of the air supplied by said compressor, control means for both said motor means including said device, said control means normally being effective in response to a demand for an increase of pressure in said intake first to operate said throttle to its maximum air flow position and second to operate said compression ratio controlling means toward its maximum air flow position, and means associated with said control means for causing a movement of said throttle in a flow decreasing direction and a substantially simultaneous compensating movement of said compression ratio controlling means in a flow increasing direction so as to maintain a substantially constant pressure in said intake while increasing the temperature therein.

8. Electrical apparatus for controlling the pressure of the air supplied to the intake of a combustion engine, comprising in combination, a throttle, first electrical motor means for operating said throttle, a compressor for supplying air to said intake through said throttle, which compressor incidentally heats the air passing through it, means for controlling the compression ratio of said compressor, second electrical motor means for operating said compression ratio controlling means, an electrical control network including a device responsive to the pressure in said intake, cyclically operating switch means for placing said network in control of said first and second motor means during alternate periods, said network and said two motor means normally operating in response to a demand for an increase of pressure in said intake first to operate said throttle to its maximum air flow position and second to operate said compression ratio controlling means toward its maximum air flow position, and means associated with said network and said switch means for introducing an electrical potential into said network during the periods when said network controls said first motor means to cause movement of said throttle in a flow decreasing direction, said network consequently operating to cause a compensating movement of said compression ratio controlling means in a flow increasing direction to maintain a substantially constant pressure in said intake and to increase the temperature therein due to the increased heat from said compressor.

9. Electrical apparatus for controlling the pressure of the air supplied to the intake of a combustion engine, comprising in combination, a throttle, first electrical motor means for operating said throttle, a compressor for supplying air to said intake through said throttle, which compressor incidentally heats the air passing through it, means for controlling the compression ratio of said compressor, second electrical motor means for operating said compression ratio controlling means, an electrical control network including a device responsive to the pressure in said intake, means responsive to a first potential of said network for controlling said first motor means, means responsive to a second potential of said network for controlling said second motor means, said network and two motor means normally operating in response to a demand for an increase of pressure in said intake first to operate said throttle to its maximum air flow position and second to operate said compression ratio controlling means toward its maximum air flow position, and means for supplying an additional potential to said first motor controlling means to cause movement of said throttle in a flow decreasing direction, said network consequently operating to cause a compensating movement of said compression ratio controlling means in a flow increasing direction to maintain a substantially constant pressure in said intake and to increase the temperature therein due to the increased heat from said compressor.

10. Apparatus for controlling the pressure of the air supplied to the intake of a combustion engine, comprising in combination, a throttle, first motor means for operating said throttle, a compressor for supplying air to said intake through said throttle, which compressor incidentally heats the air passing through it, means for controlling the compression ratio of said compressor, second motor means for operating said compression ratio controlling means, a device responsive to the pressure in said intake, control means for both said motor means including said device, said control means normally being effective in response to a demand for an increase of pressure in said intake first to operate said throttle to its maximum air flow position and second to operate said compression ratio controlling means toward its maximum air flow position, and means responsive to the occurrence of ice-forming conditions to cause a movement of said throttle in a flow decreasing direction and a substantially simultaneous compensating movement of said compression ratio controlling means in a flow increasing direction so as to maintain a substantially constant pressure in said intake while increasing the temperature therein.

11. Apparatus for controlling the pressure of the air supplied to the intake of a combustion engine, comprising in combination, a throttle, first motor means for operating said throttle, a compressor for supplying air to said intake through said throttle, which compressor incidentally heats the air passing through it, means for controlling the compression ratio of said compressor, second motor means for operating said compression ratio controlling means, a device responsive to the pressure in said intake, control means for both said motor means including said device, said control means normally being effective in response to a demand for an increase of pressure in said intake first to operate said throttle to its maximum air flow position and second to operate said compression ratio controlling means toward its maximum air flow position, and means variable in a modulating manner and associated with said control means for causing a movement of said throttle in a flow decreasing direction and a substantially simultaneous compensating movement of said compression ratio controlling means in a flow increasing direction so as to maintain a substantially constant pressure in said intake while increasing the temperature therein.

12. Apparatus for controlling the pressure of the air supplied to the intake of a combustion engine, comprising in combination, a throttle, first motor means for operating said throttle, a compressor for supplying air to said intake through said throttle, which compressor incidentally heats the air passing through it, means for controlling the compression ratio of said compressor, second motor means for operating said compression ratio controlling means, a device responsive to the pressure in said intake, control means for both said motor means including said device, said control means normally being effective in response to a demand for an increase of pressure in said intake first to operate said throttle to its maximum air flow position and second to operate said compression ratio controlling means toward its maximum air flow position, means variable in a modulating manner and associated with said control means for causing a movement of said throttle in a flow decreasing direction and a substantially simultaneous compensating movement of said compression ratio controlling means in a flow increasing direction so as to maintain a substantially constant pressure in said intake while increasing the temperature therein, and means responsive to the air temperature at a point on the discharge side of said compressor for controlling said variable means.

13. A system for controlling the pressure in the intake of a combustion engine having a compressor for supplying air to said intake, comprising in combination, means for controlling the compression ratio of said compressor, motor means for operating said ratio controlling means, a first control device responsive to the pressure of the air supplied by said compressor, a second control device which is manually operable, and means for selectively placing said motor means under control of one of said control devices so that when said motor means is under the control of one of said devices it is completely unaffected by the condition of said other device.

14. Pressure and temperature control means, comprising in combination, a chamber in which the pressure and temperature are to be controlled, a compressor for supplying said chamber with a compressible fluid, which compressor incidentally heats the fluid passing through it, valve means for controlling the flow of fluid from said compressor to said chamber, means for controlling the compression ratio of said compressor, first motor means for operating said valve means, second motor means for operating said compression ratio controlling means, a device responsive to the pressure in said chamber, control means for both said motor means including said device, and means associated with said control means for causing a movement of one of said motor means in a flow increasing direction and a substantially simultaneous compensating movement of the other of said motor means in a flow decreasing direction, so as to control the temperature in said chamber without disturbing the pressure therein.

15. Pressure and temperature control means, comprising in combination, a chamber in which the pressure and temperature are to be controlled, a compressor for supplying said chamber with a compressible fluid, which compressor incidentally heats the fluid passing through it, valve means for controlling the flow of fluid from said compressor to said chamber, means for controlling the compression ratio of said compressor, first motor means for operating said valve means, second motor means for operating said compression ratio controlling means, a device responsive to the pressure in said chamber, control means for both said motor means including said device, a device responsive to the temperature of the fluid at a point on the discharge side of said compressor, and means including said device associated with said control means and operative to cause a movement of one of said motor means in a flow increasing direction and a substantially simultaneous compensating movement of the other of said motor means in a flow decreasing direction, so as to control the temperature in said chamber without disturbing the pressure therein.

16. In a proportioning system, in combination, a followup system including a controller for operating the system in a manner to require a predetermined amount of followup action, a first device to be proportionally positioned, followup means operated thereby operative to provide only a portion of the followup action required by the system under the control of said controller, a second device to be proportionally positioned, a second followup means operated thereby operative to provide a different portion of the followup action required by said system under the control of said controller, and a selectively operable controller connected to modify the effect of said first named controller upon one of said devices so that said one device will provide a followup action over the same portion as that provided by said other device.

17. Electrical control apparatus, comprising in combination, a controller, a first and second control devices to be positioned in accordance with the operation of said controller, a first variable impedance means operated by said controller, a separate followup variable impedance means associated with each control device and adjusted thereby, an electrical network including said variable impedance means with said followup impedance means connected in series therein, means responsive to a first potential of said network controlled by said first variable impedance means and a followup impedance means adjusted by said first device for controlling said first device, and means simultaneously responsive to a second potential of said network controlled by said first variable means and followup means adjusted by said second device for controlling said second device, both of said responsive means having continuous electrical connections to said network.

18. Apparatus for controlling the pressure of the air supplied to the intake of a combustion engine, comprising in combination, a throttle, first motor means for operating said throttle, a compressor for supplying air to said intake through said throttle, which compressor incidentally heats the air passing through it, a turbine powered by the exhaust gases from said engine for driving said compressor, means for controlling the flow of exhaust gases from said engine through said turbine by controlling the pressure of said gases, second motor means for operating said flow controlling means, a first control device responsive to the pressure of the air supplied by said compressor, control means for both said motor means including said first control device, means associated with said control means for causing a movement of one of said motor means in a flow increasing direction and a substantially simultaneous compensating movement of the other of said motor means in a flow decreasing direction, and a second control device responsive to the pressure of said exhaust gases, said second control device being associated with said control means and effective when said exhaust gas pressure exceeds a predetermined value to cause said second motor means to run in a direction to decrease said exhaust gas pressure.

19. In a balanced bridge circuit, in combination, a controller for unbalancing said bridge circuit throughout a predetermined range, means responsive to unbalance of the bridge circuit, means for rebalancing said bridge circuit, a first power means controlled by said unbalance responsive means for operating said rebalancing means in a manner to rebalance said bridge only for a portion of the range of unbalance produced by said controller, a second power means controlled by said unbalance responsive means for operating said rebalancing means in a manner to rebalance said bridge for a different portion of the range of unbalance produced by said controller, and variable impedance means connected to said bridge circuit to modify the effect of said controller upon one of said power means so that said one power means will rebalance said bridge circuit over a range which includes a part of the range where the other of said power means is effective to rebalance said circuit.

20. In combination, a turbosupercharger actuated by exhaust gases, valve means for regulating the flow of exhaust gases to the turbine, a motor for controlling said valve means, and means responsive to a predetermined pressure appurtenant to an operating condition of said supercharger for positioning said valve means to maintain said predetermined pressure at a substantially constant value over a predetermined range of operation comprising a plurality of units interconnected solely by electrical leads including a manual pressure setting means, a pressure unit mounted adjacent said pressure to be regulated, and an amplifier responsive to changes in the pressure to be regulated for amplifying said pressure changes arranged to control said motor.

21. In combination, a turbosupercharger actuated by exhaust gases, a waste gate for regulating the flow of exhaust gases to the turbine, an electric motor for positioning said waste gate, means for controlling the energization of said motor to position said waste gate and maintain constant a predetermined pressure appurtenant to an operating condition of said supercharger including an electronic amplifier responsive to changes in said predetermined pressure for amplifying said changes in said predetermined pressure for controlling said motor, and means responsive to speeds above a predetermined maximum speed of said supercharger for taking over control of said amplifier and preventing said maximum speed from being exceeded.

22. In a balanced bridge circuit, in combination, a controller capable of producing a relatively large range of unbalance in said bridge circuit, a pair of rebalancing devices each capable of rebalancing said bridge circuit throughout different portions of said range of unbalance but individually incapable of rebalancing said bridge circuit throughout the complete range of unbalance which said controller is capable of producing, means responsive to unbalance in said bridge circuit for operating said devices, and a selectively variable signal source connected in said circuit to modify the action of said controller upon one of said rebalancing devices to effect simultaneous movement of said one device and the other of said devices over a common range of unbalance.

23. In combination, an engine, a plurality of regulating means for the engine, an electric motor for each regulating means for positioning it, an automatic control device responsive to a force which is a measure of engine power output, and means for causing said control device to control said motors in sequence to effect sequential operation of said regulating means as the value of said force changes, said last named means including continuously maintained electrical connections between said device and said motors so that said motors can move simultaneously if the value of said force changes in a predetermined manner such as to require movement of both motors.

24. Control apparatus for a combustion engine having a compressor and throttling means, comprising in combination, compression ratio controlling means, first motor means adjusting said ratio controlling means, second motor means adjusting the throttling means, current controlling means actuated by means responsive to an operating pressure of said engine, means including said current controlling means for causing reverse energization of only said first motor means when the operating pressure is in a first range of values, means including said current controlling means for causing reverse energization of only said second motor means when the operating pressure is in a second range of values, and means connecting said current controlling means to said first and second motor means to effect simultaneous energization of both of said motor means when the operating pressure changes in a predetermined manner such as to require movement of both of said motor means.

25. In a control for a combustion engine having a compressor, the combination comprising, means for regulating the compressing effect of the compressor, an electric motor for positioning said regulating means, means controlling the energization of said motor to position said regulating means to maintain constant a predetermined operating variable of said engine including an electronic amplifier responsive to changes in said predetermined variable for amplifying said changes for controlling said motor, and means responsive to the speed of said compressor for taking over control of said amplifier to maintain the speed of said compressor within predetermined limits.

26. In a control for a combustion engine having a compressor therefor, the combination comprising, means for regulating the compressing effect of said compressor, a motor for controlling said regulating means, and means responsive to a predetermined variable operating pressure of said engine for positioning said regulating means to maintain said predetermined pressure at a desired value comprising a plurality of units interconnected solely by electrical leads including a manual pressure setting means, a pressure responsive unit, and an amplifier responsive to changes in the pressure to be regulated for amplifying said pressure changes arranged to control said motor.

27. In a control apparatus, electric motor means, a proportioning control for energizing said motor in a predetermined manner and having rebalancing means positioned by said motor, first manual means for adjusting the effect of said control upon said motor, a source of power, a floating control for energizing said motor comprising a manually positioned double throw switch means, said manually positioned switch means arranged to connect said source to drive said motor in one direction or the other, and selectively operable switch means for connecting one or the other of said controls to said motor so that when under the control of one of said controls the motor is completely unaffected by the condition of said other control.

28. Apparatus for controlling the pressure of the air supplied to the intake of a combustion engine having a compressor for supplying air to said intake, means for controlling the compressing effect of said compressor, a single electrically controlled motor means for positioning said means for controlling the compressing effect, current controlling means for controlling the operation of said single motor means, a first device responsive to the pressure of the air supplied by said compressor, a second device responsive to the speed of said compressor, and means including both said devices for controlling the operation of said current controlling means.

HUBERT T. SPARROW.

REFERENCES CITED

The following references are of record in the file of this patent:

UNITED STATES PATENTS

| Number | Name | Date |
|---|---|---|
| 890,458 | Schley | June 9, 1908 |
| 1,086,729 | Rey | Feb. 10, 1914 |
| 1,412,586 | Welch | Apr. 11, 1922 |
| 1,508,707 | Moss | Sept. 16, 1924 |
| 1,557,793 | Berger et al. | Oct. 20, 1925 |
| 1,588,981 | Morris | June 15, 1926 |
| 1,816,787 | Moss | July 28, 1931 |
| 1,929,745 | Kuhn | Oct. 10, 1933 |
| 1,954,142 | Moffett | Apr. 10, 1934 |
| 2,047,984 | Riggs | July 21, 1936 |
| 2,228,239 | Ammann | Jan. 14, 1941 |
| 2,246,686 | Jones | June 24, 1941 |
| 2,283,175 | Berger | May 19, 1942 |
| 2,285,344 | Marples et al. | June 2, 1942 |
| 2,297,235 | Müller | Sept. 29, 1942 |
| 2,297,237 | Nallinger | Sept. 29, 1942 |
| 2,300,537 | Davis | Nov. 3, 1942 |
| 2,311,118 | Matthews et al. | Feb. 16, 1943 |
| 2,317,807 | Ryder | Apr. 27, 1943 |

FOREIGN PATENTS

| Number | Country | Date |
|---|---|---|
| 479,278 | Great Britain | Jan. 28, 1938 |
| 801,587 | France | May 23, 1936 |